US011557288B2

(12) United States Patent
Itoh et al.

(10) Patent No.: US 11,557,288 B2
(45) Date of Patent: Jan. 17, 2023

(54) HINDRANCE SPEECH PORTION DETECTION USING TIME STAMPS

(71) Applicant: INTERNATIONAL BUSINESS MACHINES CORPORATION, Armonk, NY (US)

(72) Inventors: Nobuyasu Itoh, Kanagawa (JP); Gakuto Kurata, Tokyo (JP); Masayuki Suzuki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

(21) Appl. No.: 16/845,849

(22) Filed: Apr. 10, 2020

(65) Prior Publication Data

US 2021/0319787 A1    Oct. 14, 2021

(51) Int. Cl.
 G10L 15/197    (2013.01)
(52) U.S. Cl.
 CPC .................... G10L 15/197 (2013.01)
(58) Field of Classification Search
 CPC ....... G10L 15/197; G10L 15/05; G10L 15/06; G10L 25/51; G06F 40/289
 USPC ........................................................ 704/254
 See application file for complete search history.

(56) References Cited

U.S. PATENT DOCUMENTS

| 7,706,512 | B2 * | 4/2010 | Groeger | ................... | G10L 21/00 |
| | | | | | 379/88.16 |
| 7,983,915 | B2 * | 7/2011 | Knight | ................... | G06F 16/434 |
| | | | | | 707/706 |
| 8,818,793 | B1 | 8/2014 | Bangalore et al. | | |
| 9,672,827 | B1 * | 6/2017 | Jheeta | ................... | G06F 16/338 |
| 10,109,280 | B2 | 10/2018 | Sidi et al. | | |
| 10,388,272 | B1 * | 8/2019 | Thomson | ................ | G10L 15/22 |
| 10,607,599 | B1 * | 3/2020 | Shellef | ................... | H04R 3/005 |

(Continued)

FOREIGN PATENT DOCUMENTS

| CN | 103782340 B | 1/2016 |
| CN | 110021295 A | 7/2019 |
| GB | 2489489 A | 10/2012 |

OTHER PUBLICATIONS

Nagao, Makoto, et al., "A new method of N-gram statistics for large number of n and automatic extraction of words and phrases from large text data of Japanese.," Proceedings of the 15th conference on Computational linguistics—vol. 1. Association for Computational Linguistics, Aug. 1994, pp. 611-615.

(Continued)

*Primary Examiner* — Thuykhanh Le
(74) *Attorney, Agent, or Firm* — Tutunjian & Bitetto, P.C.; Randy Emilio Tejeda

(57) ABSTRACT

A computer-implemented method of detecting a portion of audio data to be removed is provided. The method includes obtaining a recognition result of audio data. The recognition result includes recognized text data and time stamps. The method also includes extracting one or more candidate phrases from the recognition result using n-gram counts. The method further includes, for each candidate phrase, making pairs of same phrases with different time stamps and clustering the pairs of the same phrase by using differences in time stamps. The method includes further determining a portion of the audio data to be removed using results of the clustering.

20 Claims, 6 Drawing Sheets

(56) References Cited

U.S. PATENT DOCUMENTS

| | | | | |
|---|---|---|---|---|
| 10,685,652 | B1* | 6/2020 | Cherukuri | G10L 25/51 |
| 11,373,656 | B2* | 6/2022 | Kim | G10L 15/32 |
| 2006/0190809 | A1* | 8/2006 | Hejna, Jr. | H04H 60/46 |
| | | | | 704/E11.002 |
| 2007/0143110 | A1* | 6/2007 | Acero | G10L 15/05 |
| | | | | 704/251 |
| 2007/0162281 | A1* | 7/2007 | Saitoh | G06F 40/247 |
| | | | | 704/251 |
| 2008/0221882 | A1 | 9/2008 | Bundock et al. | |
| 2009/0123072 | A1* | 5/2009 | Sasaki | G06V 10/10 |
| | | | | 382/181 |
| 2013/0304472 | A1* | 11/2013 | Pakhomov | G10L 15/005 |
| | | | | 704/254 |
| 2014/0039876 | A1* | 2/2014 | Sayers | G06F 40/289 |
| | | | | 704/9 |
| 2014/0169767 | A1* | 6/2014 | Goldberg | G06Q 10/10 |
| | | | | 386/282 |
| 2014/0229167 | A1* | 8/2014 | Wolff | G10L 15/26 |
| | | | | 704/211 |
| 2015/0058006 | A1* | 2/2015 | Proux | G10L 15/26 |
| | | | | 704/235 |
| 2016/0085742 | A1* | 3/2016 | Mahmud | G06F 40/289 |
| | | | | 704/9 |
| 2016/0170964 | A1* | 6/2016 | Xu | G06N 3/0454 |
| | | | | 704/10 |
| 2016/0170966 | A1* | 6/2016 | Kolo | G06F 40/263 |
| | | | | 704/9 |
| 2017/0054964 | A1* | 2/2017 | Shi | H04N 13/167 |
| 2017/0133011 | A1* | 5/2017 | Chen | G10L 25/78 |
| 2018/0034961 | A1* | 2/2018 | Engelke | G10L 15/22 |
| 2018/0158463 | A1* | 6/2018 | Ge | G10L 17/04 |
| 2018/0270350 | A1* | 9/2018 | Engelke | G10L 15/26 |
| 2018/0349086 | A1* | 12/2018 | Chakra | H04W 64/00 |
| 2019/0043472 | A1* | 2/2019 | Garcia | G10L 21/003 |
| 2019/0295533 | A1* | 9/2019 | Wang | G10L 15/22 |
| 2019/0311331 | A1* | 10/2019 | Steinhoff | G06V 40/103 |
| 2019/0312973 | A1* | 10/2019 | Engelke | H04M 1/72433 |
| 2019/0341034 | A1* | 11/2019 | Dunning | G10L 15/26 |
| 2019/0362740 | A1* | 11/2019 | Hauptman | A61B 5/4803 |
| 2019/0371354 | A1* | 12/2019 | Lester | G10L 21/0308 |
| 2019/0394247 | A1* | 12/2019 | Garg | H04L 65/403 |
| 2020/0125639 | A1* | 4/2020 | Doyle | G06F 40/30 |
| 2020/0168241 | A1* | 5/2020 | Leong | H04R 3/04 |
| 2020/0175961 | A1* | 6/2020 | Thomson | G10L 15/28 |
| 2020/0242134 | A1* | 7/2020 | Salhin | G06F 16/906 |
| 2021/0056963 | A1* | 2/2021 | Lee | G10L 15/30 |
| 2021/0097990 | A1* | 4/2021 | Kim | G10L 15/1822 |
| 2021/0110248 | A1* | 4/2021 | Midkiff | G06Q 10/063112 |
| 2021/0141896 | A1* | 5/2021 | Streit | G06V 40/12 |
| 2021/0167850 | A1* | 6/2021 | Schmogrow | H04B 1/59 |
| 2021/0192279 | A1* | 6/2021 | Laaksonen | G06N 3/08 |
| 2021/0193169 | A1* | 6/2021 | Faizakof | G10L 15/02 |
| 2021/0264812 | A1* | 8/2021 | Phillips | G09B 5/06 |
| 2021/0295846 | A1* | 9/2021 | Yang | G10L 25/78 |
| 2021/0303724 | A1* | 9/2021 | Goshen | G10L 15/063 |
| 2021/0326379 | A1* | 10/2021 | Chopra | G06F 16/683 |
| 2021/0358496 | A1* | 11/2021 | Sukumar | G10L 15/08 |
| 2022/0103683 | A1* | 3/2022 | Engelke | G10L 25/60 |
| 2022/0138267 | A1* | 5/2022 | Otsuka | G06F 40/56 |
| | | | | 704/9 |
| 2022/0305085 | A1* | 9/2022 | Beaver | A61K 31/41 |

OTHER PUBLICATIONS

Hrúz, Marek, et al., "Convolutional neural network for speaker change detection in telephone speaker diarization system," 2017 IEEE International Conference on Acoustics, Speech and Signal Processing (ICASSP). IEEE, Mar. 2017, pp. 4945-4949.

Ju,, Yun-Cheng, et al., "Call analysis with classification using speech and non-speech features," Ninth International Conference on Spoken Language Processing, Jan. 2006, 5 pages.

Chou, Wu, et al., "Robust singing detection in speech/music discriminator design." 2001 IEEE International Conference on Acoustics, Speech, and Signal Processing. Proceedings, IEEE, May 2001, pp. 865-868, 2.

Abdullah, Hadi, et al., "Practical hidden voice attacks against speech and speaker recognition systems," arXiv preprint arXiv, Mar. 2019, 1904,05734, 15 pages.

Shimohata, Sayori, et al., "Retrieving collocations by co-occurrences and word order constraints." Proceedings of the eighth conference on European chapter of the Association for Computational Linguistics, Association for Computational Linguistics, Jul. 1997, pp. 476-481.

Jain, Anil K., et al., "Data clustering: a review" ACM computing surveys (CSUR), Sep. 1999, pp. 264-323, 31.3.

Transmittal Form PTO/SB/21 dated Apr. 10, 2020.

* cited by examiner

HINDRANCE SPEECH PORTION DETECTION USING TIME STAMPS

BACKGROUND

The present invention, generally, relates to a potential hindrance in an audio signal, and more particularly to techniques for detecting a hindrance speech portion in an audio signal.

Large amounts of speech data (hereinafter called field data) have recently been available with the emergence of a cloud type speech recognition system or a server type speech recognition system for providing voice search systems or speech recognition services, for example, in call centers. The results of unsupervised automatic recognition of these field data are useful to complement training data of models for recognition techniques, for example.

SUMMARY

According to an embodiment of the present invention, a computer-implemented method of detecting a portion of audio data to be removed is provided. The method includes obtaining a recognition result of audio data. The recognition result includes recognized text data and time stamps. The method also includes extracting one or more candidate phrases from the recognition result using n-gram counts. The method further includes, for each candidate phrase, making a plurality of pairs of same phrases with different time stamps and clustering the plurality of pairs of the same phrases by using a difference in time stamps for each pair of the same phrases. The method includes further determining a portion of the audio data to be removed using results of the clustering.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
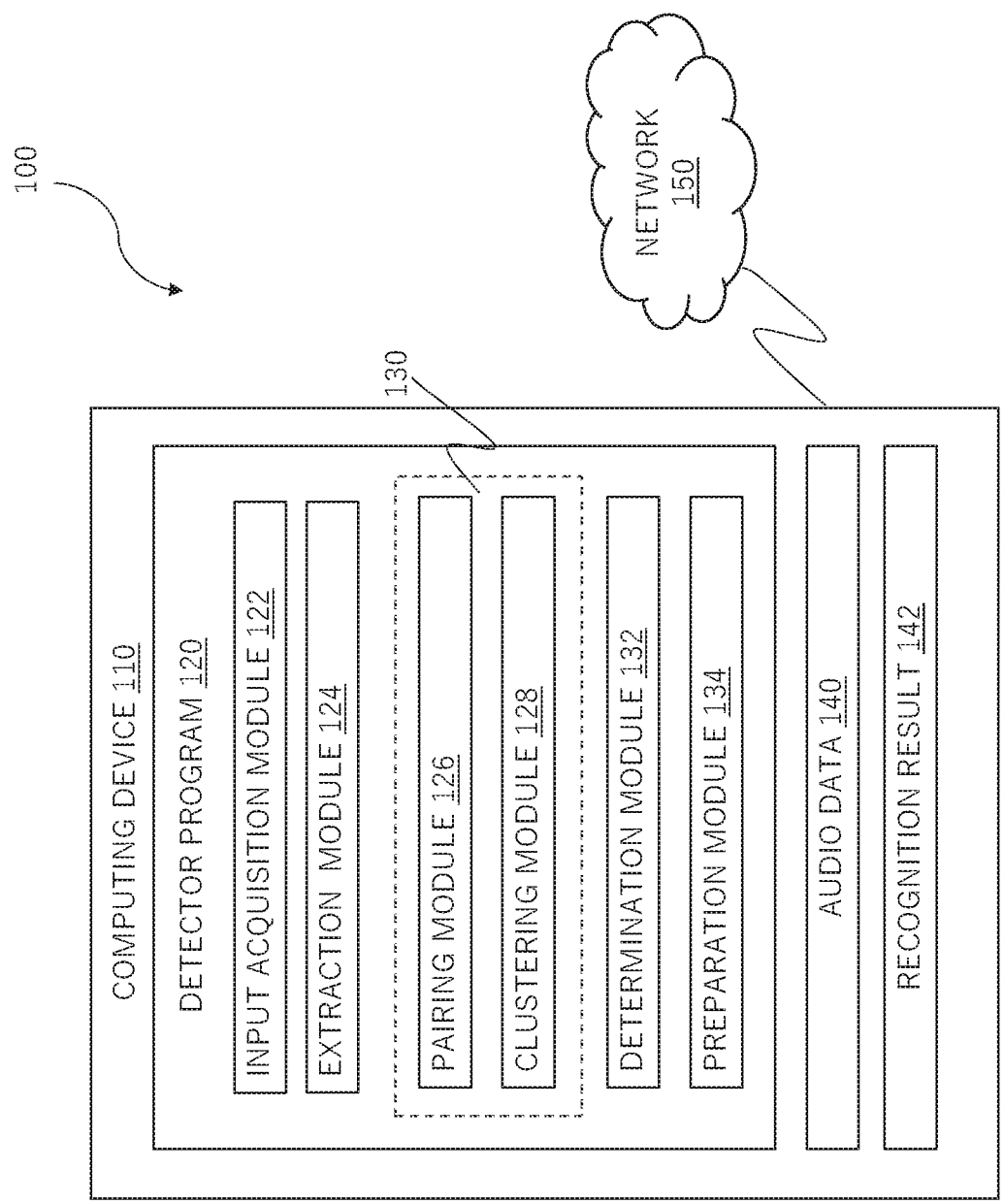
FIG. 1 is a functional block diagram illustrating a networked environment, according to an exemplary embodiment of the present invention.

Since there are many hindrances to good modeling in field data, using field data as training data without any preprocessing leads to biased models. Those hindrances include non-speech data, such as music for holding and ring tones, and speech data, such as repeatedly appearing recorded-speech.

Many research works have been reported for detecting non-speech portions mixed in the field data. However, there is no effective technique for detecting recorded speech portions as hindrances in the field data, such as phone messages. This is because it is difficult to distinguish them from other online voices by simple features.

In addition, more recently, a new problem is happening in cloud-based speech recognition systems. Some users intentionally submit recorded speech or non-recorded speech with the same content repeatedly to test or attack the recognition systems.

Embodiments of the present invention recognize that those speech signals tend to appear repeatedly in the field data, irrespective of whether submissions of those speech signals are accidental or intentional, and whether submissions of those speech signals are for test or attack, and thereby suppose that those speech signals could be hindrances to good modeling or other analyses such as text mining. Embodiments of the present invention provide techniques to detecting a portion of audio data to be removed by utilizing the recurring trends described above. Furthermore, embodiments of the present invention provide techniques to detect a portion of audio data to be removed by using the recognition result of the audio data, which includes not only recognized text data, but also time stamps.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Hereinafter, the present invention will now be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for detecting a portion of audio data to be removed by using a recognition result of the audio data, the recognition result including recognized text data and time stamps.

Hereinafter, first referring to FIGS. 1-4, a computer system for detecting a portion of audio data to be removed according to an exemplary embodiment of the present invention will be described. Then, referring to FIG. 5, a computer-implemented method for detecting a portion of audio data to be removed according to an exemplary embodiment of the present invention will be described. Finally, referring to FIG. 6, a hardware configuration of a computer system according to one or more embodiments of the present invention will be described.

Referring to FIG. 1, a functional block diagram illustrating networked environment, generally designated 100, according to one embodiment of the present invention is described.

As shown in FIG. 1, the networked environment 100 includes a computing device 110 connected over a network 150. The computing device 110 includes a detector program 120, an audio data 140, and a recognition result 142 of the audio data 140. The detector program 120 includes an input acquisition module 122, an extraction module 124, a pairing module 126, a clustering module 128, a determination module 132, and a preparation module 134.

In various embodiments of the present invention, the computing device 110 is a computing device that can be a standalone device, a server, a laptop computer, a tablet computer, a netbook computer, a personal computer (PC), or a desktop computer. In another embodiment, the computing device 110 represents a computing system utilizing clustered computers and components to act as a single pool of seamless resources. In general, the computing device 110 can be any computing device or a combination of devices with access to the audio data 140 and to the recognition result 142 of the audio data 140 which is capable of executing the detector program 120. The computing device 110 can include internal and external hardware components, as depicted and described in further detail with respect to FIG. 6.

In this exemplary embodiment, the detector program 120, the audio data 140, and the recognition result 142 of the audio data 140 are stored on the computing device 110. However, in other embodiments, the detector program 120, the audio data 140, and the recognition result 142 of the audio data 140 can be stored externally and accessed through a communication network, such as network 150. The network 150 can, for example, be a local area network (LAN), a wide area network (WAN) such as the Internet, or a combination of the two, and can include wired, wireless, fiber optic or any other connection known in the art. In general, the network 150 can be any combination of connections and protocols that will support communications between the computing device 110 and any other computing device (not shown), in accordance with a desired embodiment of the present invention.

In various embodiments, the recognition result 142 of the audio data 140 can be a set of recognition results of automatic speech recognition of various speech data. For example, such recognition results can be acquired from a cloud type speech recognition system, an interactive voice response (IVR) system, a server type speech recognition system for providing voice search systems, or speech recognition services used in call centers.

In various embodiments, the detector program 120 can detect one or more portions in the recognition result 142 of the audio data 140 which could be hindrances to good modeling or any other analyses such as text mining. Then, the detector program 120 can determine one or more portions of the audio data 140 corresponding to the one or more portions in the recognition result 142 detected as potential hindrances. Additionally, the detector program 120 can provide a training data for training a model or data suitable for analyses such as text mining by removing the potential hindrances from the recognition result 142 and the audio data 140 respectively.

In various embodiments, the detector program 120 can receive a request for preprocessing a recognition result of speech data, and more specifically for finding potential hindrances in a recognition result of speech data. The request includes the recognition result and the speech data or any indication, link, pointer or other information directing the detector program 120 to a location to retrieve the recognition result and the speech data. In some embodiments, the recognition result and the speech data are uploaded or downloaded to the recognition result 142 and the audio data 140 respectively. In other embodiments, the detector program 120 retrieves the recognition result and the speech data from another storage location connected to network 150. In such embodiments, the detector program 120 can retain, permanently or temporally, a copy of the recognition result and the speech data in the recognition result 142 and the audio data 140 respectively.

In one or more embodiments of the present invention, the recognition result 142 of the audio data 140 includes recognized text data and time stamps for words in the text data. The time stamps for words in the text data are time stamps assigned to words included in the recognized text data. All words in the recognition result 142 of the audio data 140 can be time stamped while the audio data 140 can be automatically recognized. In one or more embodiments of the present invention, the time stamp for each word w in the recognized text data can include the beginning time of the word St(w) and the ending time of the word Et(w). Based on the various methods and techniques discussed herein, the detector program 120 detects a portion of audio data 140 to be removed by using time stamps for words in the recognized text data. In a particular embodiment of the present invention, the recognition result 142 of the audio data 140 can include time stamps for phrases in the recognized text data. Alternatively, the detector program 120 can detect a portion of audio data 140 to be removed by using time stamps for phrases in the recognized text data in a similar manner. Hereinafter, the present invention will be described with respect to time stamps for words, but it will be understood by those skilled in the art that the embodiments described below are not intended to limit the scope of the present invention.

The input acquisition module 122 is configured to obtain a recognition result 142 of audio data 140, with the recognition result 142 including recognized text data and time stamps for words in the text data. The input acquisition module 122 can obtain the recognition result 142 of the audio data 140 in response to a request for preprocessing the recognition result 142 of audio data 140, as described above.

The extraction module 124 is configured to extract one or more candidate phrases from the recognition result 142 using n-gram counts. The one or more candidate phrases are phrases which appear repeatedly in the recognized text data and should therefore be removed. The extraction module 124 can extract one or more phrases each having a count of n-gram greater than a predetermined frequency threshold value as the one or more candidate phrases from the recognition result 142. The extraction module 124 uses word n-gram counts to extract the one or more candidate phrases from the recognition result 142. In a case where time stamps are time stamps for phrases, the extraction module 124 uses phrase n-gram counts. Note that the term "phrase" means a group of words that is part of or the whole of a sentence or sentences.

As for the count of n-grams, the balance of recall accuracy and clustering time in the next step should be considered to set the frequency threshold value. Furthermore, the frequency threshold value should be determined depending on the size of the recognition result 142. When the size of audio data 140 corresponding to the recognition result 142 is N hours, the frequency threshold value can be set to around k log N (where k is a constant) empirically.

The n of n-gram is any integer and the larger n is, the less likely it is to extract matching phrases by chance. On the other hand, if n is too large, the required memory and computational complexity will increase, and the processing will be extremely costly. In a particular embodiments of the present invention, the value of n can be set to 3, 4, or 5 based on empirical rules. Similar values are used in general language model processing.

The calculation of n-gram counts can also be difficult for a large value of n because of the memory limitation of a computer such as the computing device 110. For such situations, n-gram counts can be calculated for an arbitrary large value of n with a reasonable memory size in a reasonable calculation time. The entire target file/corpus can be treated as one long text string (one long sentence). Then, a table of alphabetically sorted substrings of the text string is used to obtain the value of coincidence number of prefix characters of adjacently sorted strings. After that, the frequency of n-grams can be calculated for all the existing n-character strings from the stored strings for a specific number of n. Note that this method is also applicable to other languages, including English.

Figure 2:
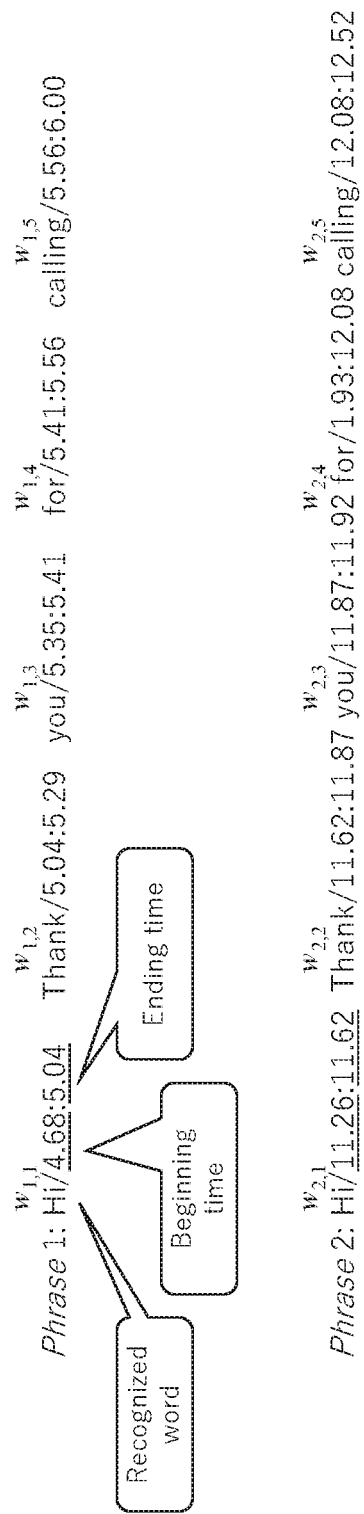
FIG. 2 is a diagram illustrating a pair of same phrases for a candidate phrase according to the exemplary embodiment of the present invention.

The pairing module 126 is configured to make, for each candidate phrase, a plurality of pairs of same phrases with different time stamps. FIG. 2 shows an example of a pair of same phrases with different time stamps for a candidate phrase, "Hi, thank you for calling". In FIG. 2, the symbol w(i, k) represents the k-th word in phrase i, and the two numbers after the slash of each word represents the beginning time of the word St(w) and the ending time of the word Et(w).

Figure 3:
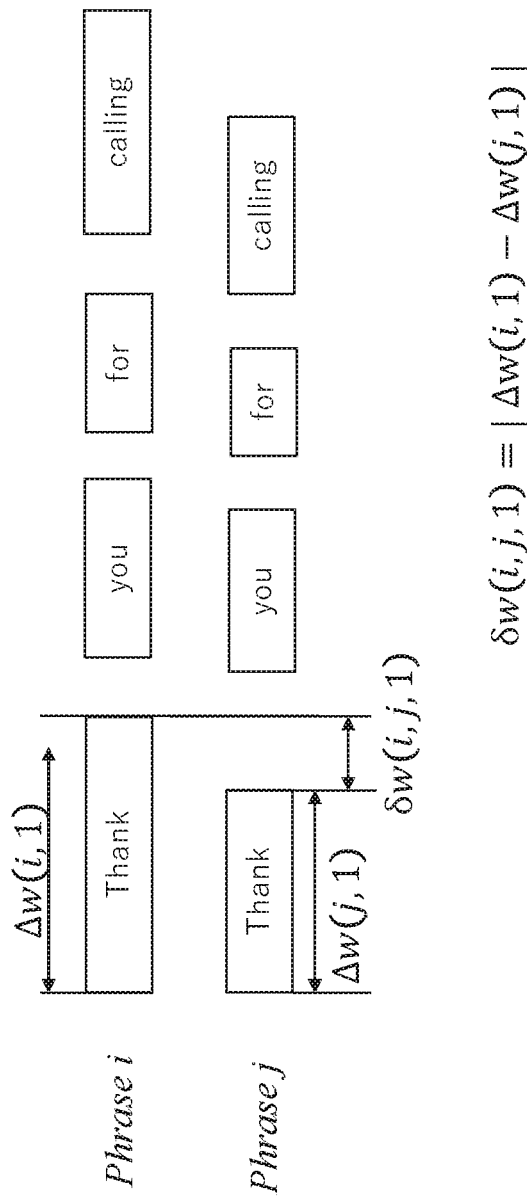
FIG. 3 is a diagram illustrating one type of a difference between n-grams in time stamps according to the exemplary embodiment of the present invention.
Figure 4:
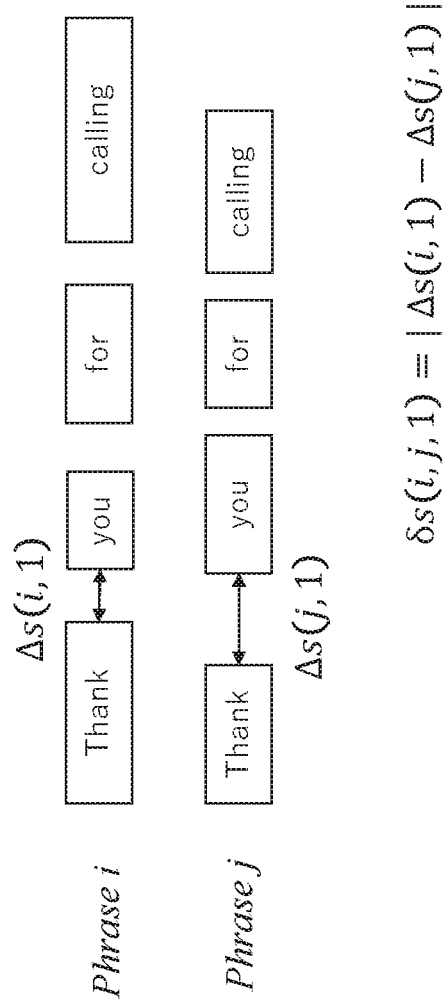
FIG. 4 is a diagram illustrating the other type of a difference between n-grams in time stamps according to the exemplary embodiment of the present invention.

For each pair of the same phrases, the pairing module 126 is configured to obtain a sum of differences in time stamps between corresponding words in the pair of the same phrases as a difference in time stamps for the pair of the same phrases. In one or more embodiments of the present invention, the differences in time stamps between corresponding words in the pairs of the same phrases has two types of differences in time stamps. With reference to FIG. 3 and FIG. 4, the two types of differences in time stamps will be described.

FIG. 3 shows a diagram illustrating one type of a difference between n-grams in time stamps according to the exemplary embodiment of the present invention. The type of the difference, between corresponding words in the pair of the same phrases shown in FIG. 3, is a difference in a duration time length of a word. In the example shown in FIG. 3, it is assumed that the candidate phrase is, "Thank you for calling," and for this candidate phrase, there is a pair of same phrases, that is, a pair of phrase i and phrase j.

As described above, the symbol w(i, k) represents the k-th word in phrase i and the symbol Δw(i, k) represents a duration time length of w(i, k) which is calculated by subtracting St(w(i, k)) from Et(w(i, k)). Further, the symbol δw(i, j, k) represents the absolute value of a difference between Δw(i, k) and Δw(j, k). This can be expressed by the following equation: δw(i, j, k)=|Δw(i, k)−Δw(i, k)|. Therefore, δw(i, j, 1) represents the absolute value of a difference in a duration time length of a word between the first word "thank" in phrase i and the first word "thank" in phrase j.

FIG. 4 shows a diagram illustrating the other type of a difference between n-grams in time stamps according to the exemplary embodiment of the present invention. The type of the difference between corresponding words in the pair of the same phrases shown in FIG. 4 is a difference in silent time length between two adjacent words. Similar to the example shown in FIG. 3, the candidate phrase is, "Thank you for calling," and for this candidate phrase, there is a pair of the same phrases, that is, a pair of phrase i and phrase j.

Similarly, the symbol w(i, k) represents the k-th word in phrase i and the symbol Δs(i, k) represents a period of silence between two adjacent words in phrase i, that is, w(i, k) and w(i, k+1), which is calculated by subtracting Et(w(i, k)) from St(w(i, k+1)). Further, the symbol δs(i, j, k) represents the absolute value of a difference between Δs(i, k) and Δs(j, k). This can be expressed by the following equation: δs(i, j, k)=|Δs(i, k)−Δs(j, k)|. Therefore, δs(i, j, 1) represents the absolute value of a difference in successive silent time length between the first word "thank" in phrase i and the first word "thank" in phrase j.

For each pair of the same phrases, the pairing module 126 can obtain a sum of differences in time stamps (hereinafter, referred to a distance between n-grams in time stamps with the symbol Distance(phrase i, phrase j)) by calculating a sum of differences in a duration time length of a word and a sum of differences in successive silent time length for all corresponding words in the pair of the same phrases. This can be expressed by the following equation:

$$\text{Distance(phrase } i, \text{ phrase } j) = \frac{1}{n}\sum_{k=1}^{n}(\delta w(i, j, k) + \delta s(i, j, k)) \qquad (1)$$

Note that k takes an integer value from 1 to n. The example shown in FIG. 2 has Distance(phrase 1, phrase 2)=0.08/5=0.016 according to the equation in (1). Also, note that in a case where time stamps are time stamps for phrases, the distance between n-grams in time stamps are calculated as a difference in a duration time length of a phrase between two phrases. The pairing module 126 can obtain the distance as a difference in time stamps for the pair of the same phrases in a particular embodiment of the present invention.

The clustering module 128 is configured to cluster, for each candidate phrase, the plurality of pairs of the same phrases by using differences in time stamps for each pair of the same phrases, in particular embodiments of the present invention, by using the distance between n-grams in time stamps for each pair of the same phrases. Good modeling requires less-biased data. For example, it is required that the training data for speech recognition contains various utterances of various people in a well-balanced manner. This means that the same utterances which appear repeatedly should not be used as the training data. The same can apply to analyses such as text mining. The same utterances can be considered to have the same contents and have no difference in time stamps. For each candidate phrase, the clustering module 128 uses differences in time stamps for each pair of the same phrases to classify the plurality of pairs of the same phrases.

In one or more embodiment, the clustering module 128 is configured to cluster the plurality of pairs of the same phrases, while allowing a difference in time stamps less than a predetermined threshold for each pair. As described above, originally the same speech data should have the same contents and have no difference in time stamps. However, in fact, there are subtle differences for various possible reasons. For example, one reason may be that by playback of a telephone message, the utterance is once converted back to analog, and then it is digitized again before being transmitted over the line. Also, if an irreversible compression is performed in the recording part of Logger, the data will be slightly different from the original utterance. Further, time stamps depend on audio stream setup. Embodiments of the present invention recognize the existence of those subtle differences in time stamps and allow a difference in time stamps less than a predetermined threshold for each pair. It is noted that the predetermined threshold is set to a small value close to 0 so that different speech data will be mistaken for being the same.

In one or more embodiment, the predetermined threshold can be determined depending on the part of the audio data to be removed. And the portion of the audio data to be removed can be at least one of recorded speech data, repeated speech data, and speech data spoken by a same speaker. As for recorded speech data and repeated speech data, those are the originally same speech data. So, the predetermined threshold can be a small value close to 0 and the same threshold can be set to recorded speech data and repeated speech data. On the other hand, even if utterances are from the same person, they are not "identical utterances", so a deviation in the time stamp can exists accordingly. A larger value (still small value close to 0) compared to those of speech data and repeated speech data can be set to the threshold for the speech data spoken by the same person. The target of the portion of the audio data to be removed depends on an application. Note that the speech data spoken by the same speaker should not be removed when an improvement of speech recognition accuracy of utterances by a small number of people is desired.

The clustering module 128 can use various clustering techniques. For simplicity, a case where there are three same phrases (d1, d2, d3), with different time stamps, for a candidate phrase will be described. First, the clustering module 128 selects the pair with the smallest difference in time stamps. It is assumed that the pair of d1 and d3 has the smallest difference value. If the smallest difference value is less that the predetermined threshold described above, the clustering module 128 determines d1 and d3 are in the same group.

Next, the clustering module 128 obtains the average values of time stamps of the group {d1, d3} and then calculates a difference in time stamps for the pair of the group {d1, d3} and d2 by using the average values of time stamps of the group {d1, d3} and time stamps of d2 in the way described in relation to the pairing module 126. If the calculated difference in time stamps is less that the predetermined threshold, the clustering module 128 determines d1, d2 and d3 are all in the same group. Otherwise, the clustering module 128 determines there are two groups, {d1, d3} and {d2}.

As for a case where there are four or more of the same phrases with different time stamps for a candidate phrase, similar steps are repeated and the clustering will terminate in response to the smallest difference in time stamps of a pair exceeding the predetermined threshold. The clustering module 128 can use other clustering techniques, including hierarchical clustering algorithms. Note that the pairing module 126 and the clustering module 128 can also be configured as one module 130 as shown by dashed lines in FIG. 1.

The determination module 132 is configured to determine a portion of the audio data 140 to be removed using results of the clustering. The results of the clustering indicate a group of same phrases that can be considered to have the same timestamps for each candidate phrase, more specifically, a group of same phrases having differences in time stamps below a predetermined threshold. The determination module 132 can determine one or more portions of recognized text data as potential hindrances in the recognition result 142 by using the results of the clustering. More specifically, the determination module 132 can determine the group of the same phrases as the potential hindrances in the recognition result 142 in response to the number of the same phrases of the group being larger than a predetermined number. Then, the determination module 132 locates one or more portions of the audio data 140 corresponding to the one or more portions of recognized text data by using time stamps as a clue.

The preparation module 134 is configured to prepare a training data for training a model by removing the one or more portions of recognized text data from the recognized text data, and the one or more portions of the audio data 140 from the audio data 140, which are determined as potential hindrances by the determination module 132. Here, the model can be a speech recognition model, a language model or an acoustic model. Note that the training data prepared by the preparation model 134 can be used as data suitable for analyses such as text mining.

Hereinafter, referring to a flowchart shown in FIG. 5, a process for detecting a portion of audio data to be removed according to an exemplary embodiment of the present invention is described in more detail.

Figure 5:
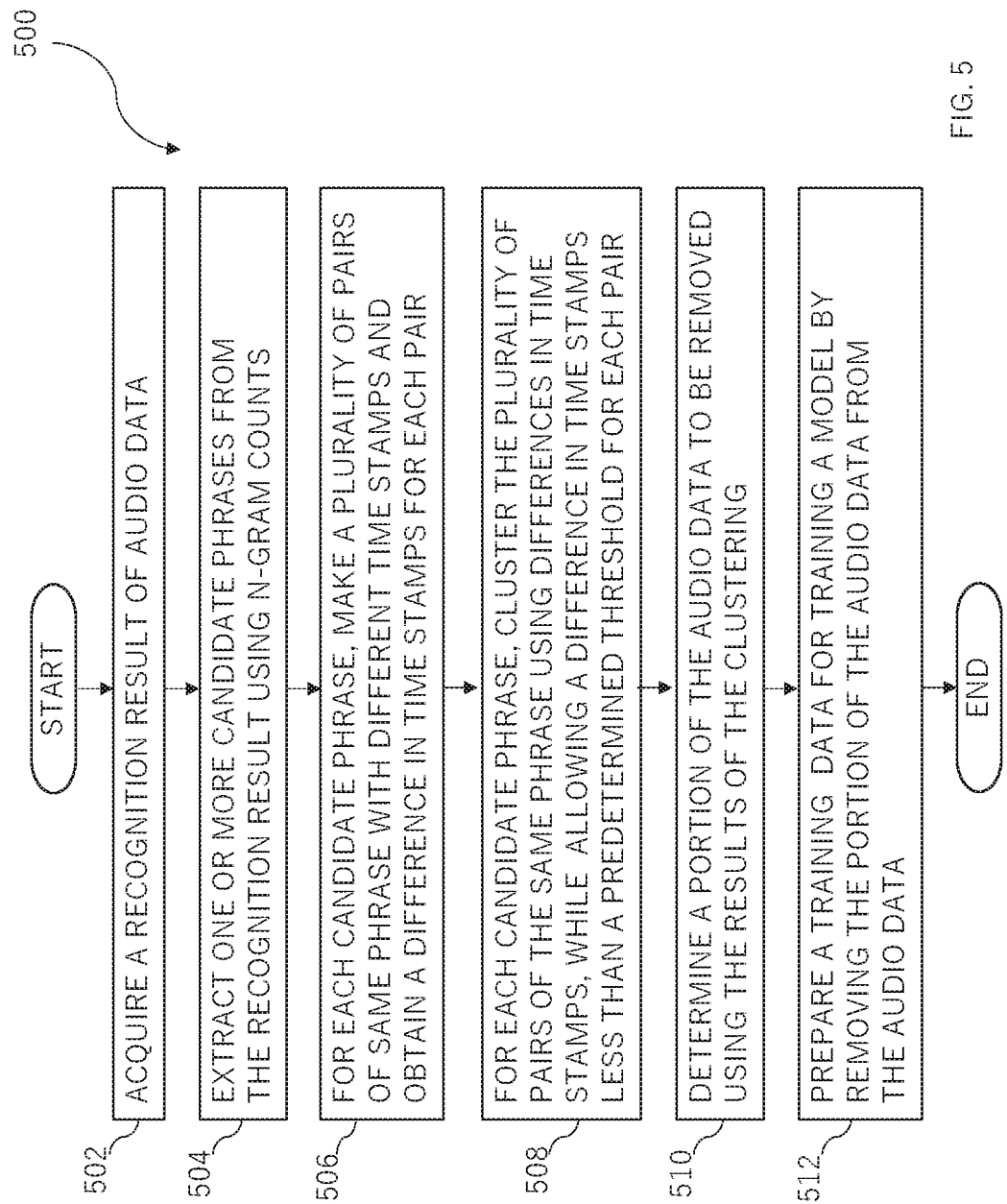
FIG. 5 illustrates operational processes of a detector program, on a computing device within the environment of FIG. 1, according to an exemplary embodiment of the present invention.

FIG. 5 illustrates operational processes, generally designated 500, of the detector program 120, on the computing device 100 within the environment of FIG. 1. In process 502, the detector program 120 acquires a recognition result 142 of audio data 140. The recognition result 142 of the audio data 140 includes recognized text data and time stamps for words in the text data. In some embodiments, the detector program 120 obtains the recognition result 142 of audio data 140 in response to a request for preprocessing a recognition result 142 of audio data 140 and the audio data 140.

In process 504, the detector program 120 extracts one or more candidate phrases from the recognition result 142 using n-gram counts. The one or more candidate phrases can be one or more candidate phrases each having a count of n-gram greater than a predetermined frequency threshold value. The predetermined frequency threshold value can be determined by a preliminary experiment. Alternatively, the detector program 120 can extract one or more candidate phrases by using an entropy defined later. The entropy is useful in natural language processing to measure the strength of certain collocations.

The probability $p(w_i)$ is determined for each adjacent word $w_i$ that can follow or precede each unique n-gram. This probability $p(w_i)$ can be determined by dividing the associated frequency $frq(w_i)$, in which a given adjacent word follows or precedes the n-gram, by the frequency count for the n-gram frq(n-gram) itself. This can be expressed by the following equation:

$$p(w_i) = \frac{frq(w_i)}{frq(n-gram)} \qquad (2)$$

At that time, the entropy of the n-gram H(n-gram) is defined as:

$$H(n-gram) = \sum_{i=1}^{m} -p(w_i)\log p(w_i) \qquad (3)$$

Note that m is a number of all possible adjacent words following the n-gram or a number of all possible adjacent words preceding the n-gram. Calculating the entropy of both sides of the n-gram, the lower one can be adopted as the entropy of the n-gram. The n-gram is extracted only if the adopted entropy of the n-gram is greater than a predetermined threshold. Many redundant expressions that could be a part of a larger, strong collocation are filtered out by using the entropy.

In process 506, the detector program 120, for each candidate phrase extracted in process 504, makes a plurality of pairs of the same phrases with different time stamps and obtains a difference in time stamps for each pair of same phrases in the manner already described with reference to FIG. 2, FIG. 3 and FIG. 4.

In process 508, the detector program 120, for each candidate phrase extracted in process 504, clusters the plurality of pairs of the same phrases using differences in time stamps, while allowing a difference in time stamps less than a predetermined threshold for each pair. The clustering algorithm used here is not limited to a specific one and the predetermined threshold can be small value close to 0.

In process 510, the detector program 120 determines a portion of the audio data to be removed using the results of the clustering in process 508. As described above, the results of the clustering indicate, for each candidate phrase, a group of same phrases having a difference in time stamps below a predetermined threshold from each other. The detector program 120 determines, for each candidate phrase, one or more portions in a recognized text data corresponding to the group of same phrases as potential hindrances. Then, the detector program 120 determines, for each candidate phrase, one or more portions of the audio data 140 corresponding to the potential hindrances in a recognized text data by using time stamps as a clue.

In process 512, the detector program 120 prepares a training data for training a model by removing one or more portions of the audio data 140 from the audio data 140 and one or more portions of the recognized result 142 of audio data 140 from the recognized result 142 of audio data 140, which are determined in process 510. Then, the operational processes 500 terminate after process 512.

According to one or more embodiments of the present invention, a novel technique capable of detecting one or more portions of audio data, more specifically, one or more portions of speech data in the field data, which could be hindrances to good modeling or other analyses such as text mining is provided.

Generally, a task of detecting one or more portions of audio data which could be hindrances to good modeling or other analyses such as text mining without predefining words or phrases which are used as canned phrases in an answering machine or an answering service such as IVR is challenging. Also note that detecting one or more portions of audio data by using such predefined words or phrases misses other potential hindrances.

In contrast, detecting one or more portions of audio data to be removed while focusing on not only the contents but also the time stamps of phrases which appear repeatedly allows more accurate detection as compared with the case where time stamps are not considered. In addition, clustering the plurality of pairs of the same phrases with tolerance for differences in time stamps less than a predetermined threshold allows higher precision of the detection as compared with the case where such differences in time stamps are not permitted.

The novel technique does not require predefined words or phrase. Further, although it uses a recognition results of speech data, it hardly depends on the recognition accuracy.

Figure 6:
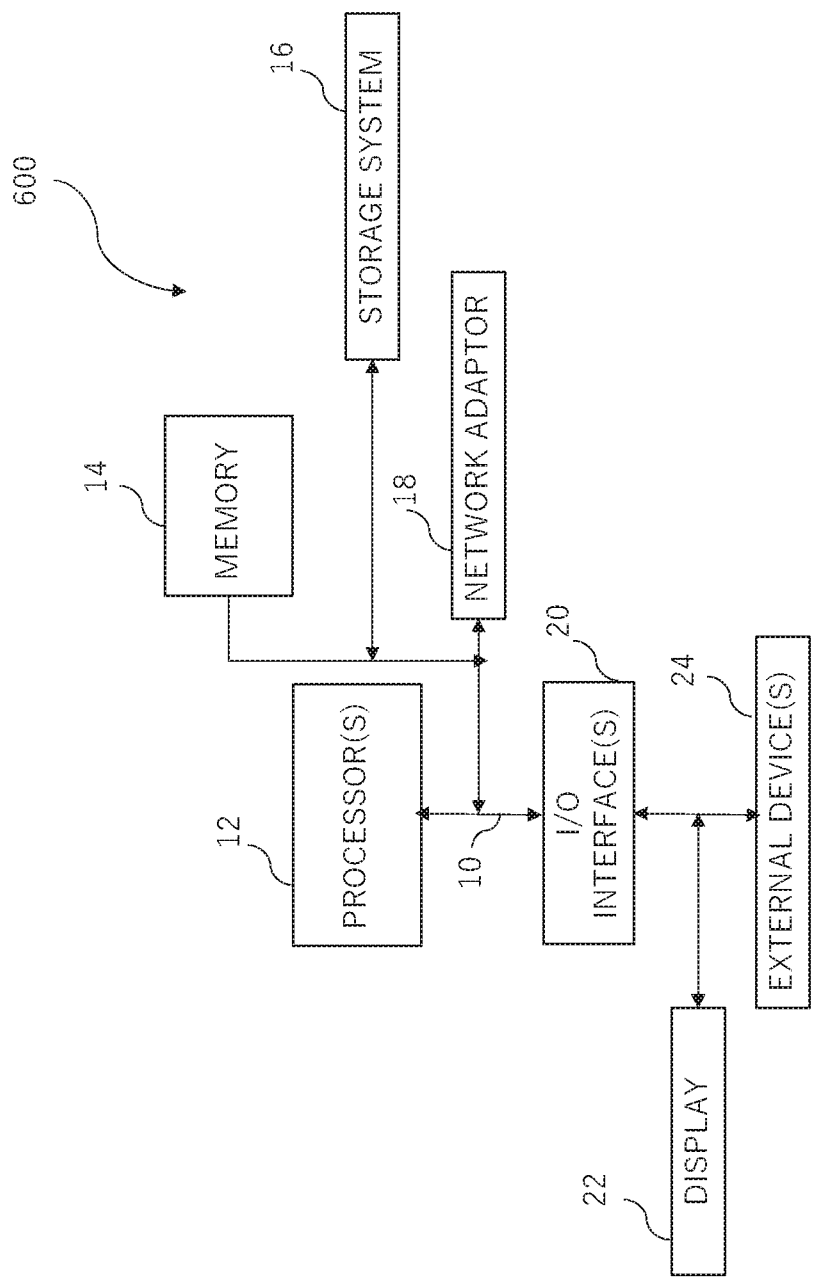
FIG. 6 depicts a computer system according to one or more embodiments of the present invention.

FIG. 6 depicts a block diagram, 600, of components of computing device 110, in accordance with an illustrative embodiment of the present invention. It should be appreciated that FIG. 6 provides only an illustration of only one implementation and does not suggest any limitations with regard to the environments in which different embodiments can be implemented. Many modifications to the depicted environment can be made.

Computing device 110 can include, but are not limited to, a communications fabric 10, which provides communications between computer processor(s) 12, a memory 14, a storage system 16, a network adaptor 18, and an input/output (I/O) interface(s) 20. The communications fabric 10 can be implemented with any architecture designed for passing data and/or control information between processors (such as microprocessors, communications and network processors, etc.), a system memory, peripheral devices, and any other hardware components within a system. For example, the communications fabric 10 can be implemented with one or more buses.

The memory 14 and the storage system 16 are computer-readable storage media. In this embodiment, the memory 14 includes a random access memory (RAM) and a cache memory. In general, the memory 14 can include any suitable volatile or non-volatile computer-readable storage media.

The detector program 120, the audio data 140 and the recognition results 142 of the audio data 140 are stored in the storage system 16 for execution and/or access by one or more of the respective computer processors 12 via one or more memories of the memory 14. In this embodiment, the storage system 16 includes a magnetic hard disk drive. Alternatively, or in addition to a magnetic hard disk drive, the storage system 16 can include a solid state hard drive, a semiconductor storage device, read-only memory (ROM), erasable programmable read-only memory (EPROM), flash memory, or any other computer-readable storage media that is capable of storing program instructions or digital information.

The media used by the storage system 16 can also be removable. For example, a removable hard drive can be used for the storage system 16. Other examples include optical and magnetic disks, thumb drives, and smart cards that are inserted into a drive for transfer onto another computer-readable storage medium that is also part of the storage system 16.

The network adaptor 18, in these examples, provides for communications with other data processing systems or devices, including resources of network 150. In these examples, the network adaptor 18 includes one or more network interface cards. The network adaptor 18 can provide communications through the use of either or both physical and wireless communications links. The detector program 120, the audio data 140 and the recognition results 142 of the audio data 140 can be downloaded to the storage system 16 through the network adaptor 18.

I/O interface(s) 20 allows for input and output of data with other devices that can be connected to computing device 110. For example, I/O interface 20 can provide a connection to an external device 24 such as a keyboard, keypad, a touch screen, and/or some other suitable input device. The external devices 24 can also include portable computer-readable storage media such as, for example, thumb drives, portable optical or magnetic disks, and memory cards. Software and data used to practice embodiments of the present invention, e.g., the detector program 120, the audio data 140 and the recognition results 142 of the audio data 140, can be stored on such portable computer-readable storage media and can be loaded onto the storage system 16 via I/O interface(s) 20. I/O interface(s) 20 also connect to a display 22.

The display 22 provides a mechanism to display data to a user and can be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, as well as each module and combinations of modules described herein can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting a portion of audio data to be removed, the method comprising:
   obtaining a recognition result of audio data, the recognition result including recognized text data and time stamps;
   extracting one or more candidate phrases from the recognition result based on a comparison between a number of times an n-gram appears within the recognition result and a threshold;
   for each candidate phrase, making a plurality of pairs of same phrases with different time stamps;
   for each candidate phrase, clustering the plurality of pairs of the same phrases by using a difference in time stamps for each pair of the same phrases; and
   determining a portion of the audio data to be removed using results of the clustering.

2. The method according to claim 1, further comprising preparing a training data for training a model by removing the portion of the audio data from the audio data.

3. The method according to claim 1, wherein the clustering the plurality of pairs of the same phrases includes clustering the plurality of pairs of the same phrases while allowing a difference in time stamps less than a predetermined threshold for each pair.

4. The method according to claim 3, wherein the predetermined threshold is determined depending on the portion of the audio data to be removed.

5. The method according to claim 4, wherein the portion of the audio data to be removed is at least one selected from the group consisting of recorded speech data, repeated speech data, and speech data spoken by a same speaker.

6. The method according to claim 3, wherein the making the plurality of pairs of the same phrases includes, for each pair of the same phrases, obtaining a sum of differences in time stamps between corresponding words in the pair of the same phrases as the difference in time stamps for each pair of the same phrases.

7. The method according to claim 6 wherein the differences in the time stamps includes a difference in a duration time length of a word.

8. The method according to claim 6, wherein the differences in the time stamps includes a difference in silent time length between two adjacent words.

9. A computer system for detecting a portion of audio data to be removed, by executing program instructions, the computer system comprising:
   a memory tangibly storing the program instructions; and
   a processor in communications with the memory, wherein the processor is configured to:
     obtain a recognition result of audio data, the recognition result including recognized text data and time stamps;
     extract one or more candidate phrases from the recognition result based on a comparison between a number of times an n-gram appears within the recognition result and a threshold;
     make, for each candidate phrase, a plurality of pairs of same phrases with different time stamps;
     cluster, for each candidate phrase, the plurality of pairs of the same phrases by using differences in time stamps; and
     determine a portion of the audio data to be removed using results of the clustering.

10. The computer system of claim 9, wherein the plurality of pairs of the same phrases is clustered while allowing a difference in time stamps less than a predetermined threshold for each pair.

11. The computer system of claim 10, wherein the predetermined threshold is determined depending on the portion of the audio data to be removed.

12. The computer system of claim 9, wherein the processor is configured to:
   prepare a training data for training a model by removing the portion of the audio data from the audio data.

13. The computer system of claim 9, wherein the processor is configured to:
   obtain, for each pair of the same phrases, a sum of differences in time stamps between corresponding words in the pair of the same phrases as the difference in time stamps.

14. The computer system of claim 13, wherein the differences in the time stamps includes a difference in a duration time length of a word.

15. The computer system of claim 13, wherein the differences in the time stamps includes a difference in silent time length between two adjacent words.

16. A computer program product for detecting a portion of audio data to be removed, the computer program product comprising a computer readable storage medium having program instructions embodied therewith, the program instructions executable by a computer to cause the computer to perform a computer-implemented method comprising:
   obtaining a recognition result of audio data, the recognition result including recognized text data and time stamps;
   extracting one or more candidate phrases from the recognition result based on a comparison between a number of times an n-gram appears within the recognition result and a threshold;
   for each candidate phrase, making a plurality of pairs of same phrases with different time stamps;
   for each candidate phrase, clustering the plurality of pairs of the same phrases by using differences in time stamps; and
   determining a portion of the audio data to be removed using results of the clustering.

17. The computer program product of claim 16, wherein the clustering the plurality of pairs of the same phrases includes clustering the plurality of pairs of the same phrases while allowing a difference in time stamps less than a predetermined threshold for each pair.

18. The computer program product of claim 17, wherein the predetermined threshold is determined depending on the portion of the audio data to be removed.

19. The computer program product of claim 16, wherein the computer-implemented method further comprises preparing a training data for training a model by removing the portion of the audio data from the audio data.

20. The computer program product of claim 16, wherein the making the plurality of pairs of the same phrases includes, for each pair of the same phrases, obtaining a sum of differences in time stamps between corresponding words in the pair of the same phrases as the difference in time stamps.

* * * * *